Aug. 27, 1929.      C. L. TAYLOR      1,726,005
SLED BRAKE
Filed July 19, 1927
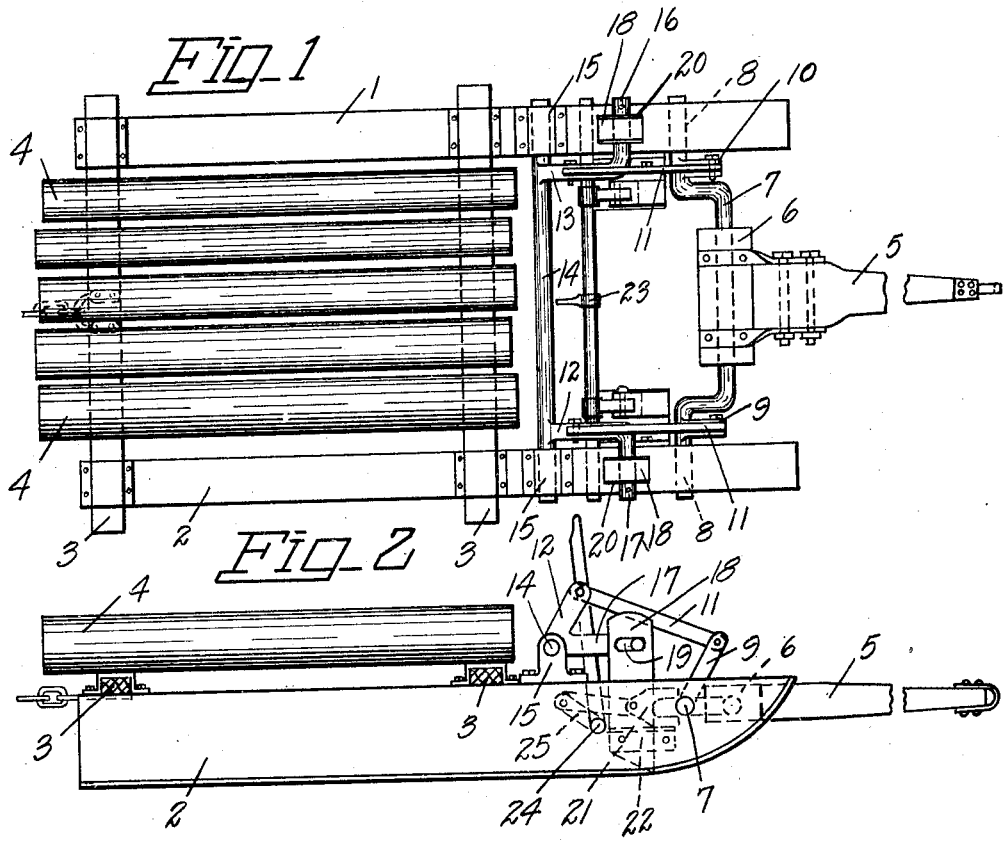
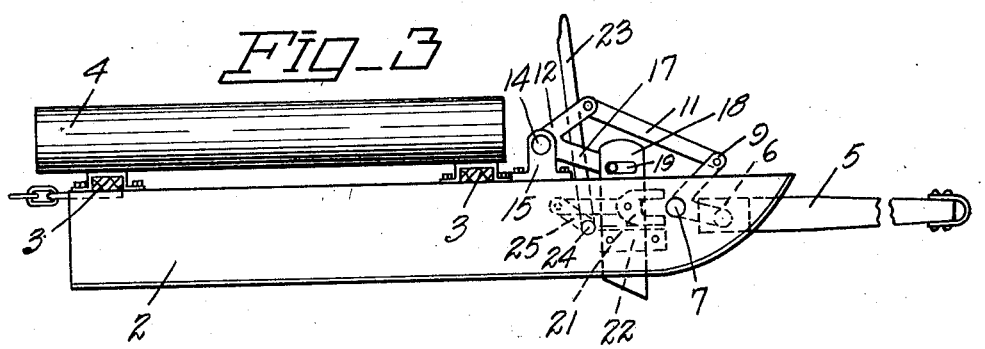
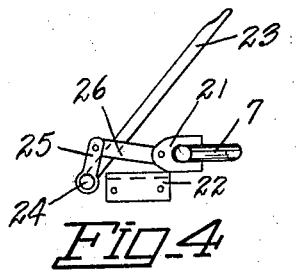
Inventor
Charles L. Taylor
By Herbert E. Smith
Attorney Patented Aug. 27, 1929.

1,726,005

UNITED STATES PATENT OFFICE.

CHARLES L. TAYLOR, OF CAREYWOOD, IDAHO.

SLED BRAKE.

Application filed July 19, 1927. Serial No. 206,851.

My present invention relates to improvements in sled brakes adapted especially for use with logging sleds, and automatically operated when the draft power is removed, and a retarding of movement is applied to the sled. The brakes are designed especially for use when the sled is going down hill and the horses pulling the sled are backing up to resist the downward movement of the sled. Means are provided for releasing and rendering inoperative the brakes when it is desired to back the sled, thus permitting freedom in movement in advance and backing the sled when desired.

The invention consists in the novel combination and arrangement of ground engaging brake members and operating means therefor as will be more fully hereinafter pointed out and claimed.

In the accompanying drawings, I have illustrated one complete example of the physical embodiment of my invention wherein the parts are combined and arranged according to the best mode I have so far devised for the practical application of the principles of my invention.

Figure 1 is a plan view of a logging sled showing the brake mechanism of my invention applied thereto;

Fig. 2 is a view in side elevation with the brakes in retracted position;

Fig. 3 is a view in side elevation with the brakes in operative position; and

Fig. 4 is a detail view showing the means for rendering inoperative the brakes in order that the sled may be backed when desired.

In carrying out my invention, I utilize the well known type of logging sled comprising a pair of spaced runners 1 and 2 which are joined by cross beams 3, and as shown in the drawings, the logs as 4 are supported on these cross beams. A draft tongue 5 is shown to which the team or teams of horses may be hitched, and this draft tongue is journaled at its rear end in bearing 6 on a crank shaft 7. The crank shaft extends transversely of the front of the sled and is fashioned with bearings or journaled ends 8 in the spaced runners 1 and 2 of the sled. Near the journaled ends of the crank shaft it is provided with crank arms 9 and 10, and each of these arms has a pivoted link 11 extending rearwardly therefrom and pivotally connected to a bell crank lever as 12 or 13. These bell crank levers are rigid with a rock shaft 14 which is located back of the crank shaft, and journaled in bearing brackets 15 secured on the top edges of the runners 1 and 2.

These bell crank levers each have a brake lever or brake arm as 16 and 17, and the annular brake levers 16 and 17 are connected with the brake shoes 18 which are slotted at 19 for the angular ends of these levers. The brake shoes are disposed perpendicularly to the sled runners, and are guided and supported in vertical slots 20 in the runners. It will be apparent that the brake shoes are to be lifted and lowered in the slots by the action of the bell crank levers, and it will be apparent that the lower ends of the brake shoes will be projected below the lower face of the runners when back pressure is applied to the tongue 5. The brake is also applied when the tongue 5 is unsupported. Thus as long as the tongue is held in the elevated position of Fig. 2, the brake shoes are held in retracted position, but when the tongue falls or drops to the lower position of Fig. 3, the crank shaft is turned, and through the links and the bell crank levers, the brake shoes are forced downwardly to operative position in Fig. 3. The same effect is produced when the horses back toward the sled as in going down hill when they hold back on the tongue 5 of the sled.

In order that the brakes may be rendered inoperative to permit backing movement of the sled, I provide a pair of stop yokes 21 which are supported upon brackets 22 fixed at the inner sides of the sled runners, and these yokes 21 are adapted to slide and be guided by the brackets into position indicated in Fig. 4. In this position, the crank shaft 7 is held so that it cannot be turned in its bearings 8, and therefore the brake mechanism is rendered inoperative. These stop yokes are manually controlled through the operation of a lever 23 on the rock bar 24 which has bearings in the runners of the sled. This rock bar has rock arms 25 near its ends, and links 26 connect these rock arms with the slide yokes 21. In Fig. 4, the operation of the stop yokes will be apparent as these parts may be manipulated by use of the lever 23.

Having thus fully described my invention, what I claim as new and desire to secure by Letters Patent is—

1. The combination in a brake mechanism for logging sleds of brake shoes and operating means therefor including a crank shaft, a slidable stop yoke adapted to engage said crank shaft, a support for said yoke, and means for operating the yoke with relation to the crank shaft.

2. The combination with a sled having vertically slotted runners and brake shoes reciprocable therein, of a crank shaft journaled in the runners and a tongue journaled on the shaft, a rock shaft and bell crank levers thereon connected to the brake shoes, a link connecting the rock shaft and crank shaft, a slidable stop yoke adapted to engage the crank shaft, a support for the yoke, and means for operating the yoke with relation to the crank shaft.

In testimony whereof I affix my signature.

CHARLES L. TAYLOR.